March 17, 1931.  L. J. SAUER  1,796,539
BALL THRUST BEARING
Filed Aug. 30, 1930

Inventor
Louis J. Sauer;
By
Jones, Addington, Ames & Seibold.
Attorneys.

Patented Mar. 17, 1931

1,796,539

UNITED STATES PATENT OFFICE

LOUIS J. SAUER, OF OAK PARK, ILLINOIS, ASSIGNOR TO CHARLES H. JOY, SR., OF CHICAGO, ILLINOIS

BALL THRUST BEARING

Application filed August 30, 1930. Serial No. 478,879.

My invention relates to ball bearings and more specifically to thrust bearings.

It is a particular object of the invention to provide a ball thrust bearing for use where the outside diameter of the bearing must necessarily be very small relative to the diameter of the shaft with which it is used. Under many conditions and in restricted places it is impossible to use a thrust bearing of comparatively large outside diameter, although the diameter of the shaft must be relatively large; and heretofore it has been necessary, in manufacturing ball bearings to suit the above-noted conditions, to use balls of very small diameter relative to the size of the retainer and to the diameter of the shaft, and in situations where the inside and outside diameters of the ball race members are necessarily comparatively small and a supporting raceway is required, it has been a problem to provide a ball retainer which would stand up in service when balls of a size suitable for the satisfactory operation of the machine have been used.

The present invention is especially desirable for use on multiple spindle drills where the shaft centers must be very close together and the shafts must be as large as possible in order to stand the comparatively heavy duty required. To the best of the applicant's knowledge no ball thrust bearing has heretofore been made which would fulfill the requirements and stand up under the severe and almost constant service required of such devices.

It has been common practice, whenever a retainer has been used, to use small balls inserted in circular openings midway between the inside and outside diameters of the retainer, the metal around the ball being swaged slightly to retain the ball in the opening. In this construction a relatively large outside to inside diameter of retainer was necessary relative to the size of the balls used, as otherwise the construction left only two very thin necks of metal at points adjacent the openings in the retainer, and these necks were very weak and still further weakened materially by the swaging of the material around the ball. The piercing of the relatively large holes through the retainer also had a tendency to warp the retainer and to crystallize the metal adjacent the openings, thereby causing the retainer to be easily broken.

In this construction the raceways have been flat, due to the small size of the balls and thickness of the retainer, which provides only a point contact, and this point contact and small ball cause the raceways to become dented and pitted and the bearing will not stand up under the strains of present-day service.

In order to provide a ball thrust bearing having a relatively large inside diameter and a small outside diameter and in which a ball race may be used, it has heretofore been necessary to dispense with the use of a retainer, and a pair of rings have been used having lateral ball races. These rings have been inserted in a small snugly-fitting ferrule and secured together by spinning the ends of the ferrule over the edges of the rings. However, this method is objectionable in that the balls are not separated and tend to drive one another, which cuts the surface of the balls and they wear very rapidly; also, as the bearing is enclosed by a ferrule, all of the dirt, chips, and metal which is ground from the balls and raceways is necessarily retained in the bearing, thereby causing it to wear out very rapidly.

In my invention, I have successfully overcome all of the above-mentioned difficulties and provide a ball bearing having a minimum outside diameter and a maximum inside diameter relative to the size of the balls used. I also provide an open bearing wherein the dirt will not be easily retained and curved raceways whereby a line of contact of the balls is assured.

While the bearing is advantageous for use wherever a bearing is desired in a restricted space, it is especially adapted for multiple spindle drills, and it has been found that by the use of the present invention a much longer service may be obtained, under heavier duty and with the spindles closer together than heretofore.

In the drawing, in which an embodiment of my invention is shown:

Figure 1:
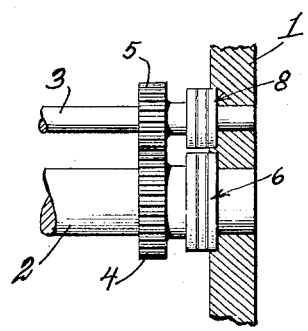
Figure 1 is a full-sized side elevation of one of my improved bearings used in connection with a one-half inch and three-sixteenths inch shaft with five-eighths inch centers.

Referring to the drawings in detail, the embodiment illustrated comprises a frame 1, in which is rotatably mounted a pair of shafts 2 and 3, on which latter are secured gears 4 and 5, respectively. These gears are in mesh and may be driven from any suitable source. A ball thrust bearing 6 is mounted on the shaft 2 and is engaged between the shoulder 7 on the shaft and the frame 1. A similar bearing 8 is mounted on the shaft 3 and is constructed exactly the same as the bearing 6, except the inside and outside diameters, which are proportionate to the size of the shaft, the cross-sectional area of the bearings being the same in both cases.

The bearings are especially adapted for use in restricted places, or where shaft centers are necessarily very close together, and in the present instance I have illustrated in Fig. 1 the bearings arranged for use with a ½″ and a 3/16″ shaft with 5/8″ centers. All of the drawings, including the enlarged views, are drawn substantially to scale.

Each bearing comprises a race plate or ring 9, fitted snugly against a shoulder on the shaft, and a second ball race member 10 fitted snugly in an annular recess in the frame 1. The inner faces of the ball race members 9 and 10 are provided with annular grooves or ball races 11 and 12, respectively, and the balls 13 are held in radial spaced relation by means of a ball retainer 14. The balls are loosely mounted in the retainer, which retainer is free to rotate therewith.

Figure 5:
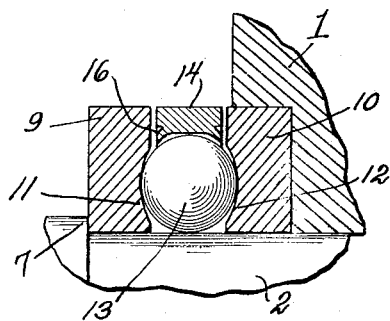
Fig. 5 is a transverse detail sectional view taken on line corresponding to line 5—5 of Fig. 4.
Figure 2:
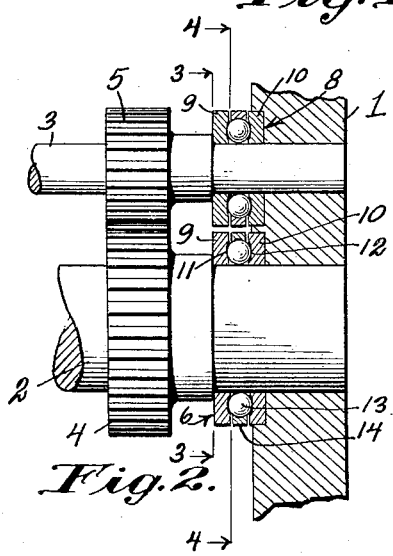
Fig. 2 is an enlarged view similar to that shown in Fig. 1, with the bearings in longitudinal section.
Figure 3:
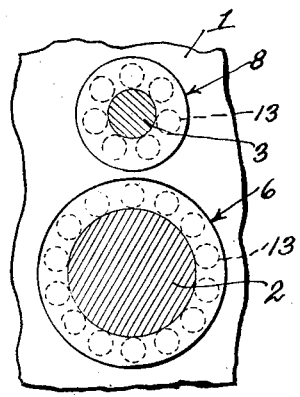
Fig. 3 is a side elevation of the bearings with the shafts shown in section on a line corresponding to line 3—3 of Fig. 2.
Figure 4:
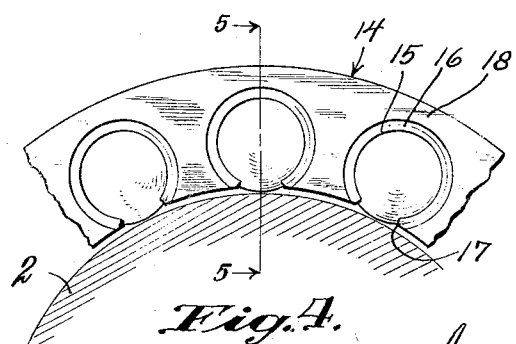
Fig. 4 is an enlarged fragmentary sectional detail taken on a line corresponding to line 4—4 of Fig. 2.

The ball retainer 14 comprises a comparatively thick ring having arcuate recesses 15 to receive the balls 13, the balls being held in the recesses by swaging a small portion of the metal inwardly around the openings, as illustrated at 16 in Figs. 4 and 5, the swaging being only sufficient to hold the balls in the recesses and allow their free rotation therein.

In the construction illustrated, the recesses are open at 17 through the inside diameters of the retainer rings 9 and 10. This leaves a connecting portion 18 having a relatively large cross-sectional area which is sufficiently strong and rugged to stand up in service.

Where the restricted space is such that it is possible to place the bearings on the various shafts out of alignment, the bearings may be overlapped and their construction will then permit of extremely small shaft centerline spacing.

It will be noted that the cross-sectional area of both the bearings is the same and the balls are the same size; the only difference being in the number of balls used. In each case, however, a sufficient number of balls is used to provide a rugged bearing of a strength proportionate to the size of the shaft.

The construction shown provides for a line bearing for the balls which prevents wear.

Having thus described my invention, what I claim and desire to secure by Letters Patent is:

A ball thrust bearing for a shaft comprising a pair of annular race members fitting close to the shaft, a single circle of balls disposed between the race members in contacting relation with the shaft, and a retainer ring for carrying the balls having arcuate ball openings therethrough opening into the central opening of the retainer ring, said retainer ring being of sufficient cross section to fill the space between the adjacent faces of said race members outside the ball circle.

In witness whereof, I have hereunto subscribed my name.

LOUIS J. SAUER.